US012710161B2

(12) United States Patent
Schösser et al.

(10) Patent No.: US 12,710,161 B2
(45) Date of Patent: Aug. 18, 2026

(54) OPERATING LAMP WITH INTERCHANGEABLE FUNCTIONAL UNITS

(71) Applicant: Dr. Mach GmbH & Co. KG, Grafing (DE)

(72) Inventors: Hansjörg Schösser, Grafing (DE); Adrian Fox, Grafing (DE); Kristian Kellner, Grafing (DE); Michael Bartesch, Grafing (DE)

(73) Assignee: Dr. Mach GmbH & Co. KG, Grafing (DE)

(*) Notice: Subject to any disclaimer, the term of this patent is extended or adjusted under 35 U.S.C. 154(b) by 0 days.

(21) Appl. No.: 19/084,041

(22) Filed: Mar. 19, 2025

(65) Prior Publication Data

US 2025/0297726 A1 Sep. 25, 2025

(30) Foreign Application Priority Data

Mar. 20, 2024 (DE) ..................... 10 2024 107 904.5

(51) Int. Cl.
*F21V 17/00* (2006.01)
*F21V 23/06* (2006.01)
*F21W 131/205* (2006.01)

(52) U.S. Cl.
CPC ............ *F21V 17/002* (2013.01); *F21V 23/06* (2013.01); *F21W 2131/205* (2013.01)

(58) Field of Classification Search
CPC ............................... F21V 17/002; F21V 23/06
See application file for complete search history.

(56) References Cited

U.S. PATENT DOCUMENTS 5,743,628 A 4/1998 Greif et al.
6,633,328 B1 10/2003 Byrd et al.
8,967,831 B2 * 3/2015 Chien ...................... F21V 3/02 362/249.02

(Continued)

FOREIGN PATENT DOCUMENTS

DE 19505925 A1 8/1996
DE 102014222793 A1 5/2016

(Continued)

OTHER PUBLICATIONS

Machine Translation (Year: 2025).*

(Continued)

*Primary Examiner* — Christopher E Dunay
(74) *Attorney, Agent, or Firm* — Kilpatrick Townsend & Stockton LLP

(57) ABSTRACT

The invention relates to an illumination device, comprising a base body, at least one light module and at least two functional units having different functionalities to one another, which are adapted to be optionally connected to the base body, each functional unit being adapted to be connected to and disconnected from the base body in a repeatable manner, so that, depending on the requirement, a predetermined functional unit can be inserted into the base body or replaced by another functional unit, each functional unit having a mechanical interface which is configured substantially in the same way across all functional units and which is adapted to engage with a matching receptacle on the base body such that the respective functional unit is secured to the base body.

12 Claims, 2 Drawing Sheets

(56) References Cited

U.S. PATENT DOCUMENTS

Figure 1:
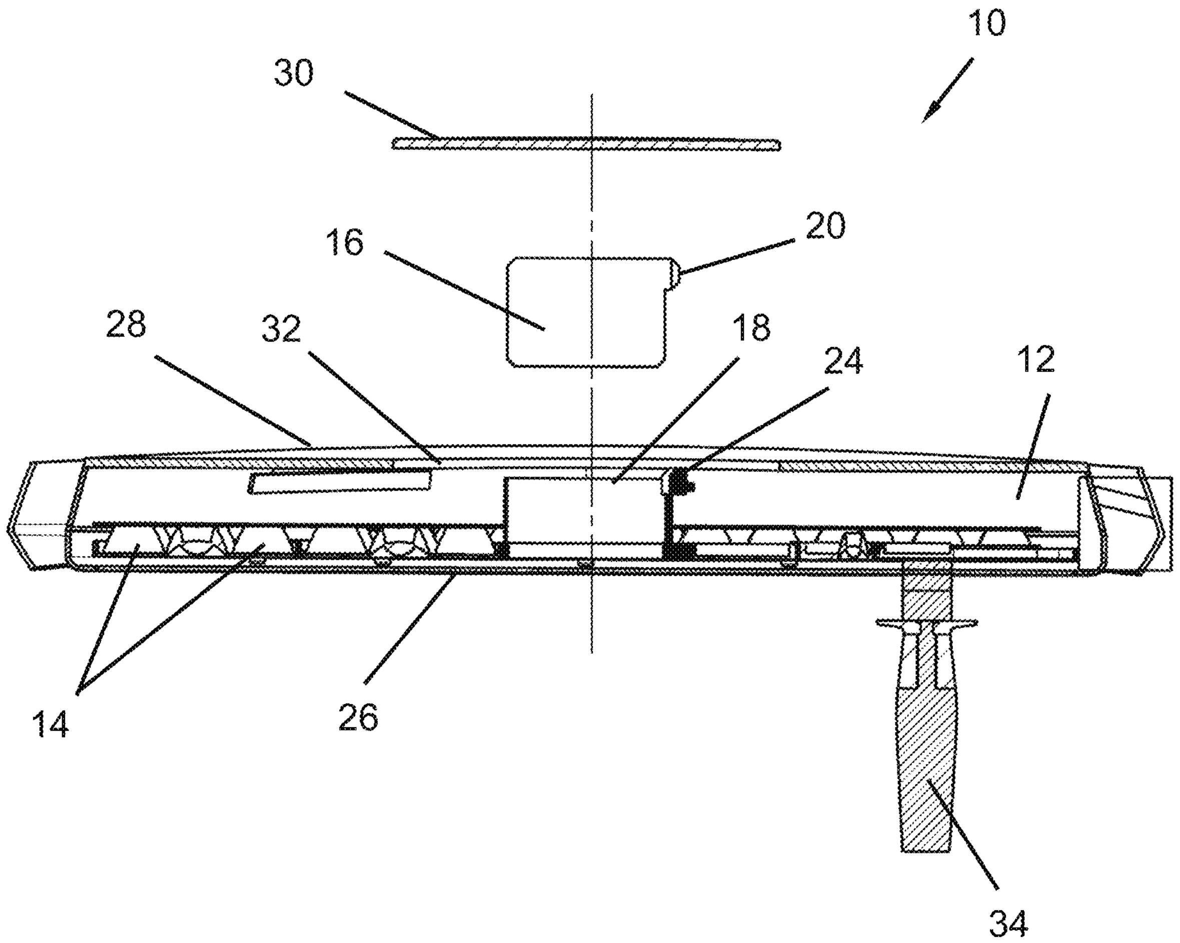

| | | | | |
|---|---|---|---|---|
| 10,383,195 | B2 | 8/2019 | Hartl et al. | |
| 10,568,181 | B2 | 2/2020 | Schmid et al. | |
| 10,653,494 | B2 | 5/2020 | Strölin | |
| 11,754,233 | B1 * | 9/2023 | Hwang | F21V 23/06 362/183 |
| 2011/0037840 | A1 * | 2/2011 | Hiltl | A61B 90/35 348/61 |
| 2017/0325319 | A1 * | 11/2017 | Schmid | H05B 45/00 |
| 2020/0271291 | A1 * | 8/2020 | Ward | F21V 33/0076 |
| 2021/0108783 | A1 | 4/2021 | Hallack et al. | |
| 2022/0082216 | A1 * | 3/2022 | Eltorai | F21V 23/023 |

FOREIGN PATENT DOCUMENTS

| | | | | |
|---|---|---|---|---|
| DE | 102014222794 | A1 | 5/2016 | |
| DE | 102015113338 | A1 | 2/2017 | |
| DE | 102016115035 | A1 * | 2/2018 | F21K 9/20 |
| DE | 102017000281 | A1 | 7/2018 | |
| WO | 2017193781 | A1 | 11/2017 | |

OTHER PUBLICATIONS

European Application No. 25164383.9, Extended European Search Report, Aug. 12, 2025, 12 pages.
German Application No. 10 2024107904.5, Search Report mailed Nov. 26, 2024, 7 pages.
German Application No. 10 2024107904.5, Search Report mailed Mar. 21, 2024, 3 pages.

* cited by examiner

OPERATING LAMP WITH INTERCHANGEABLE FUNCTIONAL UNITS

CROSS REFERENCE TO RELATED APPLICATION

This application claims priority to German Patent Application No. 10 2024 107 904.5, filed in Germany on Mar. 20, 2024, the entire contents of which are hereby incorporated herein by this reference.

The present invention relates to an illumination device which is suitable for illuminating an operating field.

Illumination devices for operating fields are known from the prior art. Illumination devices are also available with very specialized functions for certain operations, such as lamps that emit light in a specific spectral range or lamps that can be adjusted with regard to their illuminance or the illumination field they generate. However, those lamps that are specially designed for a particular application may be unusable for other applications, so that, for example, a hospital may have to keep a large number of different lamps on hand so as to be able to cover different use cases.

It is therefore the task of the present invention to provide an illumination device which is capable of being adapted to a particular application.

This task is solved according to the present invention by an illumination device which is suitable for illuminating an operating field, the illumination device comprising a base body,

- at least one light module which emits light and which is arranged on the base body, and
- at least two functional units having different functionalities to one another, which are adapted to be optionally connected to the base body of the illumination device,
- each functional unit being adapted to be connected to and disconnected from the base body in a repeatable manner, so that, depending on the requirement, a predetermined functional unit can be inserted into the base body or replaced by another functional unit,
- each functional unit having a mechanical interface which is configured substantially in the same way across all functional units and which is adapted to engage with a matching receptacle on the base body such that the respective functional unit is secured to the base body.

In this context, the term "different functionality" can mean in particular that the at least two functional units differ in at least one parameter. This can also be the case, for example, if the at least two functional units are so-called "spotlights", both of which are adapted to generate a focused illumination field, but which are adapted to generate illumination fields of different sizes at the same distance from the respective functional unit.

According to the present invention, such an illumination device can be provided which has a basic lighting functionality, namely the lighting units permanently installed in the base body, but which can be extended to include further functionalities depending on the application. In this way, one and the same illumination device, which is attached to the ceiling of an operating theater, for example, can be equipped with a wide range of additional functionalities and thus be used for a wide range of applications.

The base body can have a light-emitting surface at which the light emitted by the at least one light module can emerge from the base body, and a rear surface arranged opposite the light-emitting surface, the receptacle on the base body being arranged on the rear surface for connection to a functional unit. This can make it possible to arrange a completely closed, in particular completely flat, lens on the light-emitting surface. In particular, the receptacle can be closed by means of a flap or a lid, which can also have a sealing function. Such a cover can be configured as a separate component from the respective functional units. Alternatively, such a cover can also be permanently connected to a respective functional unit or even be integral with it, so that each functional unit provides its own cover for closing the receptacle. The opening of the receptacle can also function as service access for maintaining the illumination device. Of course, it is also conceivable that the receptacle or another similar receptacle is arranged on the light-emitting surface.

In general, it may be a requirement for the illumination device according to the invention that the base body is designed to be liquid-tight, so that an outer side of the base body can be disinfected without liquid disinfectant being able to penetrate the base body and possibly cause a malfunction there. To ensure that the cover or flap, which is fully connected to the base body, also fulfills this sealing requirement, the cover or flap can be provided with a scaling unit and/or interact with a sealing unit provided on the base body. Such a sealing unit can be a sealing cord or a sealing lip, for example.

Advantageously, at least one of the functional units can comprise an electrical interface and the receptacle of the base body can comprise a corresponding electrical mating interface, which are adapted to establish an electrical connection between the base body and the respective functional unit when the functional unit is in the arranged state in the receptacle. This means that the electrical interface provided in addition to the mechanical interface of the illumination device can, for example, be adapted to supply power to the respective functional unit mounted in the receptacle and/or, if necessary, to transmit signals generated by this functional unit to the base body of the illumination device via a corresponding electrical mating interface and, if necessary, subsequently to an associated control unit. The electrical interface and/or the electrical mating interface can also correspond with portions of the mechanical interface and/or the receptacle which are provided, for example, in the mechanical interface and the receptacle to prevent rotation of a respective functional unit mounted in the receptacle.

In particular, the functional units can have substantially the same weight as each other. This can offer the advantage that a holding device on which the illumination device or the base body of the illumination device is mounted in order to be able to move it in space, can remain in a preset weight balancing configuration. In other words, the weight balancing configuration of the holding device does not have to be readjusted when the functional unit is changed.

Thus, at least one functional unit, in particular all functional units, can have a weight of 0.3 kg to 2 kg, in particular 0.7 kg to 1.5 kg, preferably approximately 1 kg.

Furthermore, the receptacle of the base body and the interfaces of the at least two functional units can be adapted to enable tool-free connection and/or disconnection of a respective functional unit to/from the receptacle of the base body. In particular, this can mean that a user of the illumination device can remove a functional unit connected to the base body from the base body and connect another functional unit to the base body using only their hands. If the aforementioned cover or flap is configured separately from the respective functional units, this cover or flap can also be opened and closed by a user of the illumination device using only their hands. Conceivable user actions to open the cover or flap (regardless of whether the cover or flap is connected to the functional unit or is separate from it) can be, for example, a turning and/or pressing movement. The lid or flap can be pressed against a spring force that preloads the flap or lid and/or a functional unit inserted into the receptacle in a predetermined direction (e.g. against the direction in which a functional unit is inserted into the receptacle). A corresponding spring element can, for example, be arranged in the receptacle of the base body. For example, the pressing movement exerted by the user can be followed by a turning movement, in the manner of a bayonet fastening, to open the lid or flap.

For example, the functional units can comprise at least two of:

- an optical detection unit for light visible to humans;
- an optical detection unit for UV light;
- an optical detection unit for infrared, in particular near-infrared, light;
- an emission unit for laser light;
- an emission unit for light which essentially corresponds to the spectrum of the at least one light module of the illumination device, the emission unit being adapted in particular to emit the light in a focused manner such that an illumination field is generated which has a higher luminance than the illumination field generated by the at least one light module;
- an emission unit for light which is different from the spectrum of the at least one light module of the illumination device, in particular has a bluish spectrum in the range from 460 nm to 480 nm and/or a greenish spectrum in the range from 500 nm to 550 nm, the emission unit being adapted in particular to emit the light in a focused manner such that an illumination field is generated which has a higher luminance than the illumination field generated by the at least one light module;
- a power supply unit which is adapted to supply the illumination device with power in such a way that the illumination device can be operated autonomously;
- a gesture detection unit for detecting gestures of a user, the gesture detection unit being connected to a control unit which is adapted to assign control instructions to the user's gestures, according to which an operating mode of the illumination device is to be changed;
- a microphone unit which is adapted to detect sounds, in particular a user's voice commands.

The power supply unit can be adapted to supply the illumination device with power for 10 to 30 minutes, in particular for 20 minutes. If, for example, the power fails in an operating theater, the illumination device can be operated autonomously via the power supply unit independently of the building's power supply so that, for example, an ongoing operation can be continued. As an alternative or in addition to the power supply unit, it is conceivable that an illumination device comprises a battery separate from the functional units, which is installed in the base body, for example. This means that, in the event of a power failure, the illumination device could also be operated with a functional unit that is not a power supply unit.

The gesture detection unit can comprise a camera which is adapted to detect hand movements of a user of the illumination device and to transmit associated signals to the control unit. This means that the illumination device can be operated, for example in order to adjust its brightness and/or lighting direction and/or focus, without the user having to touch the illumination device.

The illumination device can also comprise a data transmission module which is adapted to send and/or receive information relating to the illumination device, in particular relating to the at least two functional units, to and/or from a data processing unit arranged externally to the illumination device. Such data transmission can be carried out wirelessly via WLAN, Bluetooth, short-range radio communication, mobile Internet or similar data transmission methods, for example. It is also conceivable that the data transmission takes place wirelessly in the near vicinity of the illumination device to a receiver unit located there, from which the data transmission is forwarded by wire to the data processing unit. The data transmission from the illumination device to the data processing unit can of course be fully wired. This can be the case in particular if the data processing unit is located in the near vicinity of the illumination device, for example within the hospital in which the illumination device is installed.

The data sent and/or received via the data transmission module can be suitable to, for example:

- indicate a total operating time of a respective functional unit; and/or
- indicate a unique identifier of a respective functional unit; and/or
- transmit a coding of the respective functional unit that, in particular, is unique to a manufacturer of the respective functional unit; and/or
- indicate a state of charge of a respective functional unit.

At least a selection, in particular all, of the data sent and/or received via the data transmission module can be stored in a log file, which is created, for example, in a memory unit of the control unit or is already present there. For example, one log file can be used for several, in particular all, functional units used with the illumination device, or a separate log file can be used for each functional unit used with the illumination device. In relation to a respective functional unit, which can be distinguished via the log file(s), for example by means of its unique coding/identification, such as its serial number, the previous total operating time of the functional unit in the respective illumination device can be kept up to date. Furthermore, the log file(s) can be used to trace which functional units were used at what time and/or for how long in a particular illumination device. Of course, it is alternatively or additionally conceivable that the log file(s) are stored in a storage unit located within the illumination device.

In particular, the control unit of the illumination device can be adapted to receive the coding of the respective functional unit and to evaluate it such that operation of the respective functional unit in the base body of the illumination device is only possible on the basis of an admissible coding, in particular a coding stored in a memory unit of the control unit. Based on the evaluation of the transmitted data, use of the functional unit in the base body can be prevented in the event that a functional unit has been introduced into the base body that does not originate from the manufacturer of the illumination device.

Furthermore, use of the functional unit in the base body can be prevented in the event that the prescribed total operating time of the functional unit has been exceeded, so that the manufacturer no longer guarantees correct operation of the functional unit. In connection with the total operating time of a functional unit, it can be provided that a corresponding message can be output at least at a predetermined interval before the total operating time is reached. Such a message can appear on a screen to which the illumination device is operatively connected and/or via an LED, for example a colored LED, on the functional unit itself and/or via an acoustic signal.

Advantageously, at least one of the functional units, in particular all of the functional units, can be adapted to transmit information relating to the respective functional unit, in particular information relating to a weight of the respective functional unit, to the illumination device. The information transmitted from a respective functional unit to the illumination device can also be used to adjust the functionality of a handle connected to the illumination device. For example, turning the handle can focus the spotlight in a spot lighting functional unit and cause the light spectrum to change in a functional unit that emits light in only one predetermined light spectrum, the width of this spectrum being significantly smaller than the width of the visible light spectrum. Furthermore, in particular but not limited thereto, an illuminance emitted by the functional unit inserted in the base body can be transmitted by this functional unit, for example to an associated control unit. As it may be a mandatory requirement for the illumination device that an illuminance of 160,000 lx at a distance of 1 meter is not exceeded, the control unit can change a light intensity, in particular the luminous flux, of the functional unit and/or of the at least one light module of the base body in order to comply with the mandatory requirement.

In this context, the illumination device can also comprise a holding device which is adapted to hold the illumination device positionably in space, the holding device being adapted to carry out automated readjustments on the basis of the information transmitted from the functional unit to the illumination device, in particular the weight of the functional unit. The weight balancing configuration described above can thus be automatically recalibrated if the illumination device is operated with a functional unit that has a different weight compared to a previously used functional unit, or without a functional unit. This can save a user the time needed to carry out the readjustment.

The present invention will be explained in more detail below on the basis of an exemplary embodiment with reference to the attached drawings. These show the following:

FIG. 1: A side cross-sectional view of an embodiment of the illumination device according to the invention, and FIG. 2A perspective view of the illumination device according to the invention.

In FIG. 1, an illumination device according to the invention is generally designated by the reference number 10. The illumination device 10, which is shown in FIG. 1 in a side cross-sectional view, comprises a base body 12 and a plurality of light modules 14 arranged thereon, which are adapted to emit light. Furthermore, in the embodiment shown here, the illumination device 10 comprises two functional units 16.

The functional units 16, of which only one can be seen in FIG. 1, are intended to be optionally inserted into a receptacle 18 of the base body 12. A functional unit 16 can be attached to the base body 12 via a mechanical interface 20 which is configured substantially in the same way on the functional units 16, the mechanical interface 20 matching the receptacle 18 being formed as a simple, substantially cylindrical portion in the embodiment shown here.

Also, disconnection of the functional unit 16 from the base body 12, for example in order to replace it with another functional unit 16, can be ensured by the mechanical interface 20 and the matching receptacle 18. For example, it is conceivable that an elastic element, such as a spring, is provided on the receptacle 18, which preloads the respective functional unit 16 in the removal direction from the receptacle 18.

In the embodiment shown, the functional unit 16 is connected to and/or disconnected from the receptacle 18 of the base body 12 without tools by simply inserting it into and removing it from the receptacle 18.

In a possible embodiment, one of the two functional units 16 can be a spotlight with a more focused illumination field compared to the illumination field of the light modules 14 of the base body 12. The other of the two functional units 16 can be a laser light emission unit that projects a specific pattern, which in the simplest case is at least one dot, onto a surface. This means that the illumination device 10 can be equipped or converted for a wide range of applications with different requirements.

In addition to the mechanical interface 20, the illumination device 10 can also have an electrical interface 22, which is adapted, for example, to supply power to the respective functional unit 16 accommodated in the receptacle 18. It is also conceivable that signals generated by this functional unit 16 are transmitted via the electrical interface 22 to the base body 12 of the illumination device 10 and, if necessary, subsequently to an associated control unit (not shown). For this purpose, the receptacle 18 shown in FIGS. 1 and 2 comprises a corresponding electrical mating interface 24. Of course, the electrical interface 22 or the electrical mating interface 24 can also correspond with portions of the mechanical interface 20 or the receptacle 18 which are provided, for example, in the mechanical interface 20 and the receptacle 18 to prevent rotation of a respective functional unit 16 mounted in the receptacle 18.

The illumination device 10 comprises a light-emitting surface 26, at which the light emitted by the light modules 14 can emerge from the base body 12. On the side opposite the light-emitting surface 26, the base body 12 has a rear surface 28. In the embodiment shown here, the receptacle 18 is arranged on the rear surface 28 of the base body 12, thus allowing the insertion or removal of a functional unit 16 on the rear surface 28.

A cover 30 is also shown in FIG. 1. Here, the cover 30 is inserted into an opening 32 arranged in the rear surface 28. The cover 30 can thus close the receptacle 18 and seal the base body 12, in particular fluidically, on the receptacle 18. The cover 30 is configured here as a component separate from a respective functional unit 16. However, it is also possible that a cover 30 is permanently connected to a respective functional unit 16 or even formed integrally with it. In this way, a separate cover 26 could be provided for each functional unit 16 in order to close the receptacle 18.

The cover 30 can be connected to the receptacle 18 via connecting means (not shown). For example, the receptacle 18 can have projections which are adapted to interact with corresponding recesses on the cover to hold it in the receptacle 18. Of course, the recesses and projections can also be arranged on the other element of the receptacle or cover or on both. For example, the recesses can be configured and the cover 30 spring-loaded such that a combined pushing and turning movement is required in order to release the cover 30 from the receptacle 18. This prevents unintentional release of the cover 30 from the receptacle 18.

Figure 2:
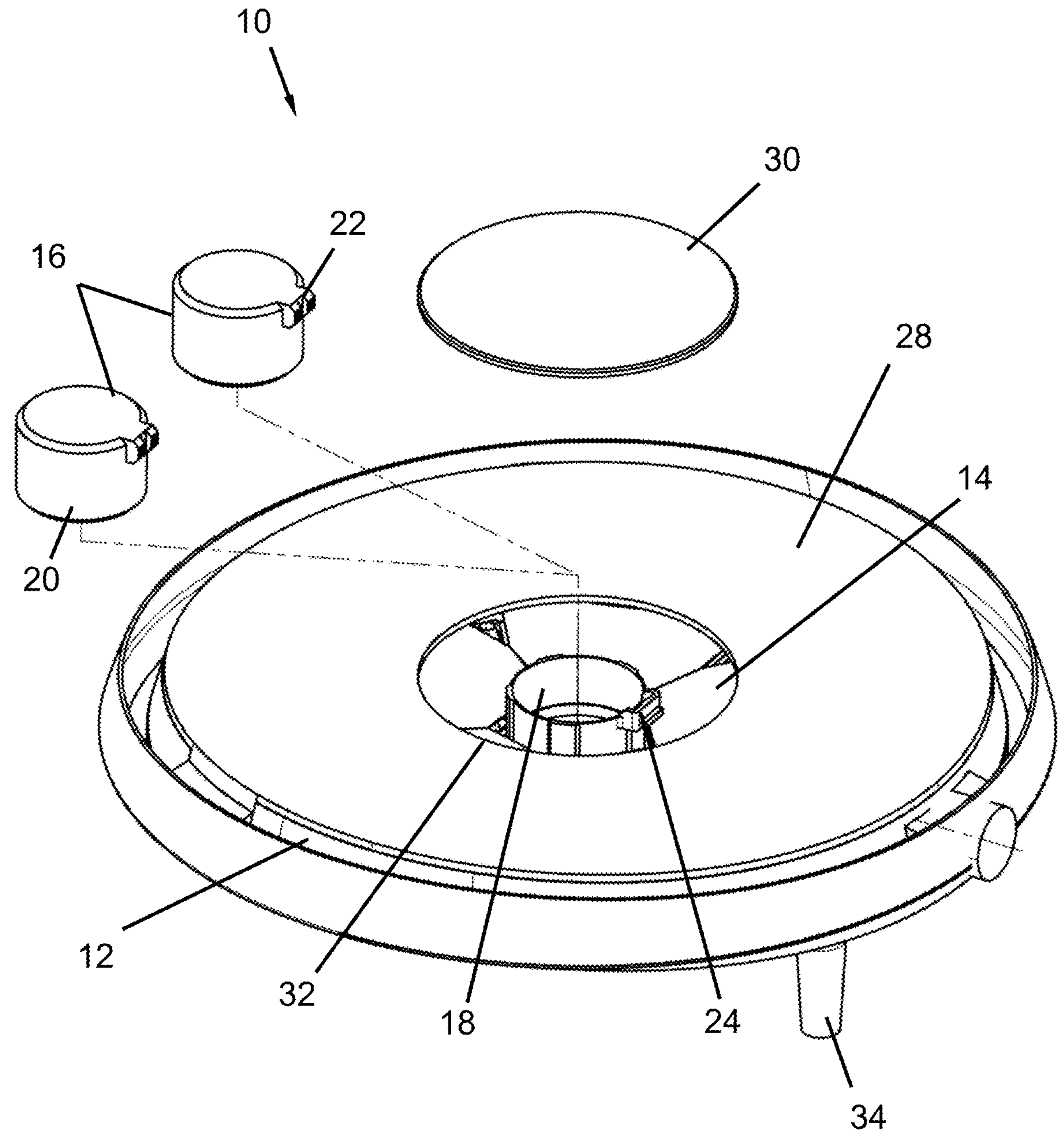

FIGS. 1 and 2 also show a handle 34, which is connected here to the base body 12 of the illumination device 10 on the side of the light-emitting surface 26. The base body 12 can be positioned in space using the handle 34. Furthermore, the handle 34 can be used to control the respective functional unit 16, for example to change a respective functionality. It is therefore conceivable that turning the handle 34 can adjust the focus of the spotlight in the case of a spot lighting functional unit 16 and cause the light spectrum to change in the case of a functional unit 16 that emits light in only one predetermined light spectrum.

FIG. 2 shows a perspective view of the illumination device 10 according to the invention. The two functional units 16 are shown in FIG. 2. A respective functional unit 16 can optionally be inserted into the receptacle 18 of the base body 12 (see dashed line from the functional units 16 to the receptacle 18).

FIG. 2 also shows that at least some of the light modules 14 can be accessed via the opening 32 on the rear surface 28 of the base body 12, so that the opening 32 can also serve as an access opening for maintenance and repairs to the light modules 14.

The invention claimed is:

1. Illumination device which is suitable for illuminating an operating field, the illumination device comprising:

a base body;

at least one light module which emits light and which is arranged on the base body; and at least two functional units having different functionalities to one another, which are adapted to be optionally connected to the base body of the illumination device, each functional unit being adapted to be connected to and disconnected from the base body in a repeatable manner, so that, depending on the requirement, a predetermined functional unit can be inserted into the base body or replaced by another functional unit, each functional unit having a mechanical interface which is configured substantially in the same way across all functional units and which is adapted to engage with a matching receptacle on the base body such that the respective functional unit is secured to the base body;

wherein the illumination device comprises a data transmission module which is adapted to send and/or receive information relating to the illumination device to and/or from a data processing unit arranged externally to the illumination device, and wherein the data sent and/or received via the data transmission module is suitable to:

indicate a total operating time of a respective functional unit; and/or transmit a coding of the respective functional unit that is unique to a manufacturer of the respective functional unit; and/or indicate a state of charge of a respective functional unit.

2. Illumination device according to claim 1, wherein the base body has a light-emitting surface at which the light emitted by the at least one light module can emerge from the base body, and a rear surface arranged opposite the light-emitting surface, the receptacle on the base body being arranged on the rear surface for connection to a functional unit.

3. Illumination device according to claim 1, wherein at least one of the functional units can comprise an electrical interface and the receptacle of the base body can comprise a corresponding electrical mating interface, which are adapted to establish an electrical connection between the base body and the respective functional unit when the functional unit is in the arranged state in the receptacle.

4. Illumination device according to claim 1, wherein the functional units have substantially the same weight as each other.

5. Illumination device according to claim 4, wherein at least one functional unit has a weight of 0.3 kg to 2 kg.

6. Illumination device according to claim 1, wherein the receptacle of the base body and the mechanical interface of the at least two functional units are adapted to enable tool-free connection and/or disconnection of a respective functional unit to/from the receptacle of the base body.

7. Illumination device according to claim 1, wherein the functional units comprise at least two of:

an optical detection unit for light visible to humans;

an optical detection unit for UV light;

an optical detection unit for infrared light;

an emission unit for laser light;

an emission unit for light which essentially corresponds to the spectrum of the at least one light module of the illumination device;

an emission unit for light which is different from the spectrum of the at least one light module of the illumination device;

a power supply unit which is adapted to supply the illumination device with power in such a way that the illumination device can be operated autonomously;

a gesture detection unit for detecting gestures of a user, the gesture detection unit being connected to a control unit which is adapted to assign control instructions to the user's gestures, according to which an operating mode of the illumination device is to be changed;

a microphone unit which is adapted to detect sounds.

8. Illumination device according to claim 7, wherein the power supply unit is adapted to supply the illumination device with power for 10 to 30 minutes.

9. Illumination device according to claim 7, wherein the gesture detection unit comprises a camera which is adapted to detect hand movements of a user of the illumination device and to transmit associated signals to the control unit.

10. Illumination device according to claim 1, wherein a control unit of the illumination device is adapted to receive the coding of the respective functional unit and to evaluate it such that operation of the respective functional unit in the base body of the illumination device is only possible on the basis of an admissible coding.

11. Illumination device according to claim 1, wherein at least one of the functional units is adapted to transmit information relating to the respective functional unit to the illumination device.

12. Illumination device according to claim 11, wherein the illumination device further comprises a holding device which is adapted to hold the illumination device positionably in space, the holding device being adapted to carry out automated readjustments on the basis of the information transmitted from the functional unit to the illumination device.

* * * * *